Patented May 15, 1923.

1,455,060

UNITED STATES PATENT OFFICE.

CHARLES V. BACON, OF MAHWAH, NEW JERSEY.

PROCESS OF RECOVERING IRON OXIDE AND OTHER PRODUCTS FROM SPENT IRON SLUDGE

No Drawing.   Application filed October 5, 1922. Serial No. 592,603.

*To all whom it may concern:*

Be it known that I, CHARLES V. BACON, a citizen of the United States, residing at Mahwah, in the county of Bergen and State of New Jersey, have invented a new and useful Improvement in Processes of Recovering Iron Oxide and Other Products from Spent Iron Sludge, of which the following is a specification.

This invention relates to a process for utilizing the spent iron sludge, commonly known as aniline reduction sludge, reductor sludge, etc., which is obtained as a by-product from the manufacture of aniline, xylidine, toluidine, methaphenylenediamine and such other products that yield a product which is usually magnetic and essentially comprises free or combined oxide of iron.

My investigations have led to the discovery that the aforesaid spent iron sludge, which heretofore has been either discarded as valueless or, when the ore market conditions permitted, converted by furnacing to iron sinter, is admirably adapted for the production of a high grade oxide of iron which is capable of serving as a buffing or polishing material, paint pigment or jeweler's rouge. Furthermore, that in order to accomplish the economical and homogeneous conversion of such sludge into high grade oxide of iron, it is essential to effect such conversion under special conditions of concentration and temperatures all as hereinafter set forth in detail.

In carrying out my invention, I preferably proceed as follows:

A sufficient quantity of water is mixed in a suitable mixer with spent iron sludge, such as above defined, in order to convert the same into a pasty mass containing about 30% water. To this mixture is then added, with constant stirring, an amount of sulfuric acid, about 70% strength, sufficient to satisfy the iron oxide content of said sludge and on subsequent heating convert the same into ferrous and ferric sulphates substantially according to the equation:

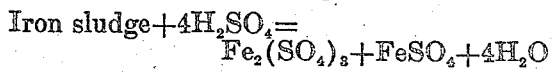

Iron sludge + $4H_2SO_4 = Fe_2(SO_4)_3 + FeSO_4 + 4H_2O$

The concentration of the acid employed depends on the aqueous content of the mass of sludge and should be sufficiently dilute to insure that the water content of the resultant mixture will be above the amount required to produce a pasty mass. Depending on the moisture content of the sludge treated, the acid employed should be of such strength that the mixture of water and acid contain at least 38% water and will substantially correspond to acid of a strength less than a strength of 50° Bé. otherwise the mixture will become substantially solid and the production of the porous, spongy, sulphate-containing mass, hereinafter described, cannot be obtained.

The paste-like mixture of sludge and acid obtained by the above treatment is heated, until the acid content has become concentrated and the oxides converted into a porous, spongy mass of sulphates which is highly suited for the production in a subsequent furnacing operation of a homogenous pure iron oxide.

The sulphates so obtained are then calcined for a sufficient time at a sufficiently high temperature to decompose the same into ferric oxide and a gaseous mixture of sulphur dioxide and trioxide as represented substantially by the following equations:

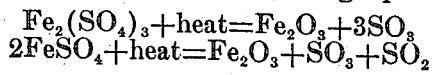

$$Fe_2(SO_4)_3 + \text{heat} = Fe_2O_3 + 3SO_3$$
$$2FeSO_4 + \text{heat} = Fe_2O_3 + SO_3 + SO_2$$

Owing to the fact that the sludge and acid mixture is in the form of an aqueous paste before being converted into sulphates, such conversion of the iron oxide to sulphates is much more complete and uniform, that is were the mass to remain in the form of a coarse grained powder owing to the employment of an acid of high concentration, as described in my copending application No. 348,775, which has matured into Patent Number 1,428,521, dated Feb. 14, 1922, wherein it is proposed to substantially prevent the formation of a pasty mass such as is essential in the improved process herein described. Furthermore, the decompositions of said mixed sulphates as prepared by this process occurs very readily, usually requiring but a few hours when operating on large charges.

The sulphuric acid, hereinbefore referred to, of 70% strength corresponds to 55° Bé. and acid of 50° Bé. corresponds to acid of 62% strength.

No claim is made to the treatment of sulphuric acid and sludge mixture which contains less than 38% of water for as stated the novel and efficient results herein described cannot be obtained if the mass becomes substantially solid almost immediately upon the addition of the acid to the sludge.

Preferably, however, the mixture of sulphuric acid and iron sludge contains not less than 50% of water.

Having thus described my invention, what I claim and desire to secure by U. S. Letters Patent is:

1. The process which consists in subjecting iron sludge comprising essentially highly impure iron oxide and while in a pasty condition to the action of a quantity of sulphuric acid sufficient to at least correspond to a substantially combining weight as compared with the amount of iron oxids treated, heating the mass to a sufficient temperature and for a sufficient time to concentrate the acid and convert the mass into a porous spongy condition then elevating the temperature and roasting the resultant mass to effect the decomposition thereof into oxy-sulphur acid gases and iron oxide and separately recovering such iron oxide.

2. The process which consists in subjecting magnetic iron sludge comprising essentially impure oxids of iron with a sufficient quantity of an aqueous solution to convert the same into a paste, subjecting said oxids while in such pasty condition to the action of sufficient sulphuric acid to substantially satisfy chemically the iron oxide content thereof and then heating the resultant mass to a sufficient temperature and for a sufficient time to concentrate the acid and convert the mass into a porous, spongy condition then elevating the temperature and continuing the heating until the resultant sulphate-containing mass is decomposed into iron oxide and oxy-sulphur gases, then separately recovering said iron oxide in a substantially dry condition.

3. The process which consists in subjecting an aqueous mixture of sulphuric acid and iron sludge, comprising essentially impure oxide of iron mixed with not less than equal parts by weight of water, to a heating operation to concentrate the acid content thereof and convert the mixture into a porous, spongy sulphate product and then heating the resultant mass to an elevated temperature for a sufficient time to decompose the sulphate contained in said mass into iron oxide and oxy-sulphur gases, then separately recovering said iron oxide in a substantially dry condition.

Signed at New York city in the county of New York and State of New York this 3rd day of Oct., 1922.

CHAS. V. BACON.